United States Patent [19]

Jordan

[11] Patent Number: 5,639,323
[45] Date of Patent: Jun. 17, 1997

[54] METHOD FOR ALIGNING MINIATURE DEVICE COMPONENTS

[75] Inventor: Stephen G. Jordan, Fremont, Calif.

[73] Assignee: AIWA Research and Development, Inc., Fremont, Calif.

[21] Appl. No.: 390,469

[22] Filed: Feb. 17, 1995

[51] Int. Cl.$^6$ .................................................. B32B 31/00
[52] U.S. Cl. .................... 156/64; 156/299; 228/180.21; 437/8
[58] Field of Search ............... 156/64, 299; 200/317; 228/180.1, 180.21, 180.22; 437/8, 228, 229

[56] References Cited

U.S. PATENT DOCUMENTS

| | | | |
|---|---|---|---|
| 3,428,872 | 2/1969 | Yoshida et al. | 317/234 |
| 3,457,639 | 7/1969 | Weller | 29/626 |
| 3,811,186 | 5/1974 | Larnerd et al. | 29/626 |
| 4,537,509 | 8/1985 | Kronfeld | 356/399 |
| 4,537,827 | 8/1985 | Little et al. | 156/64 X |
| 4,742,431 | 5/1988 | Igarashi | 361/398 |
| 4,871,404 | 10/1989 | Murata et al. | 156/73.1 |
| 4,985,107 | 1/1991 | Conroy et al. | 156/299 |
| 4,999,077 | 3/1991 | Drake et al. | 156/299 |
| 5,074,947 | 12/1991 | Estes et al. | 156/299 X |
| 5,128,283 | 7/1992 | Tanaka | 437/228 |
| 5,130,660 | 7/1992 | Flint et al. | 324/662 |
| 5,257,091 | 10/1993 | Caicedo, Jr. | 365/358 |
| 5,262,257 | 11/1993 | Fukuda et al. | 430/5 |
| 5,336,357 | 8/1994 | Layher et al. | 156/299 X |
| 5,386,626 | 2/1995 | Cheng | 228/180.22 X |
| 5,417,784 | 5/1995 | Kobayashi et al. | 156/64 |
| 5,459,081 | 10/1995 | Kajita | 437/8 X |

FOREIGN PATENT DOCUMENTS

| | | |
|---|---|---|
| 0515786A1 | 2/1992 | European Pat. Off. . |
| 0634701A1 | 1/1995 | European Pat. Off. . |
| 3734670A1 | 6/1988 | Germany . |
| 2166888 | 5/1986 | United Kingdom . |
| 0444450A1 | 5/1986 | United Kingdom . |

OTHER PUBLICATIONS

"Automatic Semiconductor Positioning System Using an Image Dissector," IBM Technical Disclosure Bulletin, New York, Apr. 1972, vol. 14, No. 11, pp. 3367–3369.

Primary Examiner—David A. Simmons
Assistant Examiner—Paul M. Rivard
Attorney, Agent, or Firm—Skjerven, Morrill, MacPherson, Franklin & Friel

[57] ABSTRACT

A method and structure for affixing a component to a structure in an aligned position facilitates fabrication of diminutive assemblies, such as integrated circuits. The component is placed upon a support structure. The component has an alignment marking. The support structure has a viewing aperture and an alignment pattern. The support structure and component are arranged so that the alignment marking and the alignment pattern are visible through the viewing aperture. The alignment marking and the alignment pattern are simultaneously viewed through the viewing aperture and the component is aligned upon the support structure so that the alignment marking of the component is aligned with respect to the alignment pattern of the support structure. The aligned component is bonded to a structural member.

16 Claims, 7 Drawing Sheets

METHOD FOR ALIGNING MINIATURE DEVICE COMPONENTS

BACKGROUND OF THE INVENTION

1. Field of the Invention

The present invention relates to fabrication of miniature electronic devices and, more particularly, to a structure and manufacturing method for detecting and correcting the orientation of a device component with respect to a mounting structure.

2. Description of the Related Art

Assembly of miniature integrated circuits, such as microelectronic and thin-film device circuits, is slow and therefore expensive. Because individual circuit components are so diminutive, typically a few microns to a tenth of a micron in size, maintaining precise alignment with respect to a structure upon which a component is mounted and supporting the component during attachment are very difficult tasks. Highly reliable position control is fundamental to mounting devices and components in the correct place or position with respect to the mounting structures.

A specific problem arises while attempting to properly align particular discrete circuit components, such as thin film magnetic heads, with a mounting structure to ensure accurate bonding, maximum conductive contact and proper alignment with a recording medium. Thin film magnetic heads increase the storage density in magnetic media storage devices by forming a large number of heads simultaneously on a common supporting member. Media is recorded and read as it traverses the thin film magnetic media heads. For accurate recording and reading of the magnetic media, it is important that media head gaps for a particular recording track are parallel to the direction of media movement. The media includes reference surfaces that engage fixed position locators in the media drive. The fixed position locators define reference planes, and the read and write head gaps are aligned with a particular reference plane for proper operation. A slight misalignment can reduce the reliability of the contact and impair reading and writing of recording media.

SUMMARY OF THE INVENTION

In accordance with a first embodiment of the present invention, a method of affixing a component to a structure in an aligned position includes the step of placing the component upon a support structure. The component has an alignment marking. The support structure has a viewing aperture and an alignment pattern. The support structure and component are arranged so that the alignment marking and the alignment pattern are visible through the viewing aperture. The method includes the step of simultaneously viewing the alignment marking and the alignment pattern through the viewing aperture and aligning the component upon the support structure so that the alignment marking of the component is aligned with respect to the alignment pattern of the support structure. The method further includes the step of bonding the aligned component to a structural member.

In accordance with a second embodiment of the present invention, a method is furnished of affixing a component to a structure in an aligned position. A layer of photoresist is deposited on a first surface of a transparent substrate wafer and formed into a well structure having an interior aperture and exterior walls which are formed to support the component. A prealignment or coarse positioning guide is marked into the well structure so that the coarse positioning guide is visible through a second surface of the transparent substrate wafer with the second surface opposing the first surface. A component having an alignment marking on a surface upon the well structure is placed so that the alignment marking is visible through the interior aperture of the well structure and through the second surface of the transparent substrate wafer. The component is aligned within the well structure so that the alignment marking of the component is aligned with respect to the coarse positioning guide of the well structure as viewed simultaneously through the interior aperture of the well structure and through the second surface of the transparent substrate wafer. The aligned component is then bonded to a structural member.

This method aligns and affixes components to a structural member or support structure at particular connection sites with improved accuracy of alignment. This technique is advantageous for precisely aligning miniature electronic components during fabrication and is useful for simply and accurately detecting the position of a part.

In accordance with a third embodiment of the present invention, a structure is supplied which includes a transparent substrate having opposing first and second substantially-planar surfaces. A photoresist well structure is formed upon the first surface of the transparent substrate. The photoresist well structure has an interior aperture, an exterior wall and an alignment pattern formed into the exterior wall. A component has a substantially planar surface which is positioned within the well structure. The substantially planar surface has a medial portion, lateral edges and an alignment marking formed upon the medial portion. The component is placed in the well structure so that the lateral edges are supported by the exterior wall, the medial portion overlies the interior aperture and the component is aligned with respect to the transparent substrate by aligning the alignment marking with the alignment pattern.

In accordance with a third embodiment of the present invention, the support structure includes a support platform, a first transparent substrate wafer, and a second transparent substrate wafer. The support platform has a support platform viewing aperture and a vacuum aperture. The first transparent substrate wafer is positioned adjacent to a first planar surface of the support platform and has a substrate wafer viewing aperture arranged in line with the support platform viewing aperture. The second transparent substrate wafer is adjacent to a second planar surface of the support platform opposite to the first planar surface. The second transparent substrate wafer is positioned to seal the support platform viewing aperture. Using this third embodiment to align a component, the component is held to the first transparent substrate wafer by applying a suction force to the vacuum aperture while the component is aligned.

These structures and methods permit the precise alignment of components in the manufacturing and packaging of devices. Furthermore, the structure facilitates simple and precise position detection of components.

BRIEF DESCRIPTION OF THE DRAWINGS

The appended claims specify the features of the invention which are believed to be novel. However, the structure and method embodiments are best understood by referring to the following description and accompanying drawings, in which:

DETAILED DESCRIPTION OF THE PREFERRED EMBODIMENTS

Figure 1:
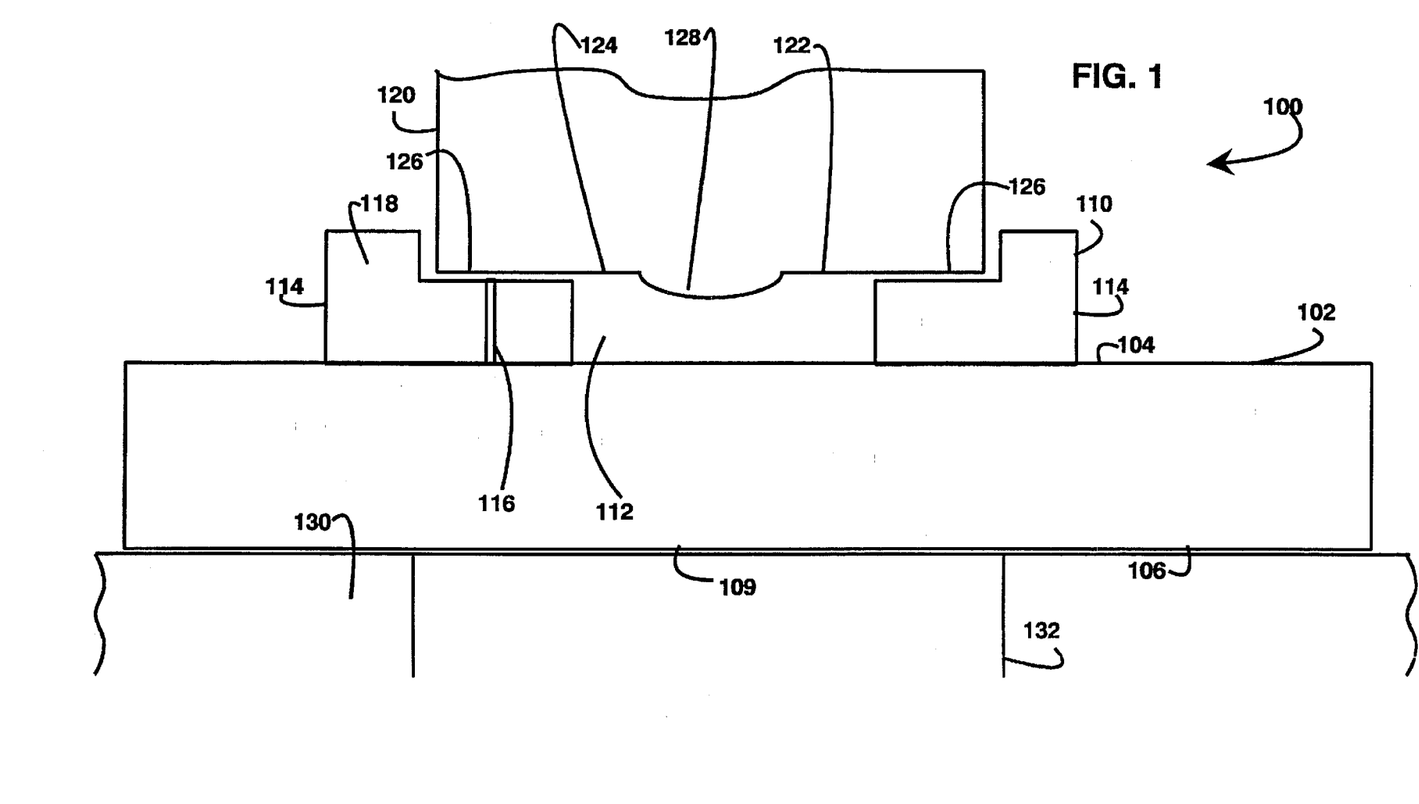
FIG. 1 illustrates a side cross-sectional view of a first embodiment of a structure upon which device components are mounted.
Figure 2:
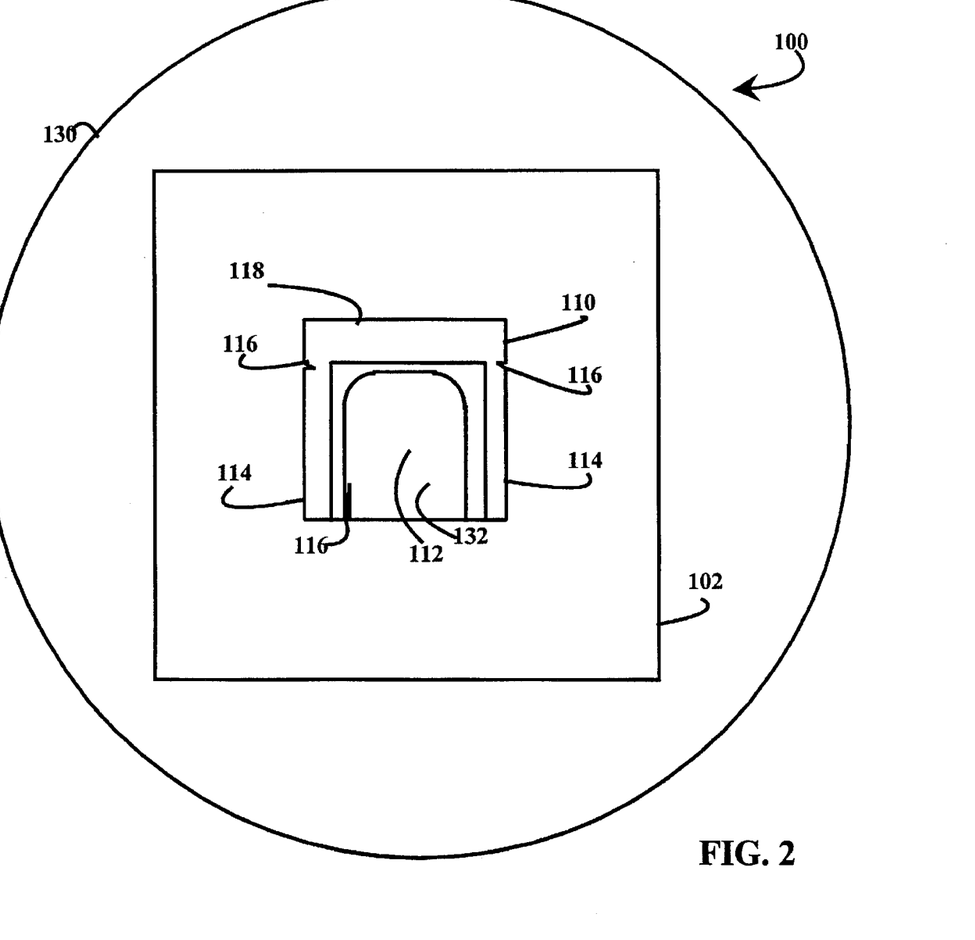
FIG. 2 illustrates a top plan view of the first embodiment structure shown in FIG. 1.

FIG. 1 illustrates a side cross-sectional view of a structure 100, such as an integrated circuit structure, upon which device components are mounted. The structure 100 includes a transparent substrate wafer 102 which has a substantially-planar shape and includes a first planar surface 104 and a second planar surface 106 on the opposite sides of the wafer 102. The transparent substrate wafer 102 may be constructed from a material such as transparent quartz, glass, epoxy, fiber glass or plastic. In some embodiments, the transparent substrate wafer 102 forms a transparent quartz lens which has advantageous optical properties of clarity and a highly uniform surface, combined with substantial strength. Overlying the first planar surface 104 of the transparent substrate wafer 102 is a photoresist well structure 110 which has an interior aperture 112, an exterior wall 114 and an alignment pattern 116 formed into the exterior wall 114. The interior aperture 112, exterior wall 114 and alignment pattern 116 are also shown in FIG. 2 which depicts a top plan view of the structure 100. The photoresist well structure 110 is patterned into a deposited photoresist layer 118 so that the alignment pattern 116 is visible through a bottom surface 109 of the transparent substrate wafer 102. The photoresist layers 118 are formed from an optically transparent film.

Referring again to FIG. 1, the structure 100 also includes a component 120 which may be any suitable device component but which is depicted as a thin-film magnetic head in the illustrative embodiment. The component 120 has a substantially planar surface 122 with a medial portion 124, lateral edges 126 and an alignment marking (also called a "fiducial") 128 formed upon the medial portion 124. The substantially planar surface 122 of the component 120 is positioned upon the photoresist well structure 110 so that lateral edges 126 are supported by the exterior wall 114, the medial portion 124 overlies the interior aperture 112 and the component 120 is aligned with respect to the transparent substrate wafer 102 by aligning the alignment marking 128 with the alignment pattern 116. The alignment marking 128 is previously formed on the substantially planar surface 122 of the component 120, and the component 120 is positioned over the interior aperture 112 of the photoresist well structure 110 so that a bottom surface of the component is visible through the bottom surface 109 of the transparent substrate wafer 102.

The structure 100 also includes a support platform 130 which is disposed beneath the transparent substrate wafer 102 and affixes the wafer 102 by adhesive or mechanical clamping. The support platform 130 is any suitable structure, for example a flat metal plate or a metal cylinder. An aperture 132 in the support platform 130 is formed, for example by drilling, for viewing the component 120. In other embodiments, the transparent substrate wafer 102 is affixed to the support platform 130 using a suitable adhesive or other coupling so that the wafer 102 can be inclined at any angle with respect to the support platform 130.

The sizes of the support platform 130, substrate wafer 102 and photoresist well structure 110 are determined by the particular application and the size of the particular component 120 which is mounted and aligned. In one example, the component 120 is a thin film magnetic head which is approximately a 1 mm$^2$ wafer having a thickness of about 0.7 mm. The exterior wall 114 of photoresist well structure 110 has a generally square form with a size of approximately 4 mm$^2$ and an interior aperture 112 of roughly 0.7 mm$^2$. The substrate wafer 102 is an approximately 10 mm$^2$ square block of transparent quartz with a thickness of about 1.5 mm. The support platform 130 is a circular flat metal plate with a diameter, for example, of 40 mm, a 4 mm$^2$ internal aperture and a thickness of 50 mm.

Figure 3A:
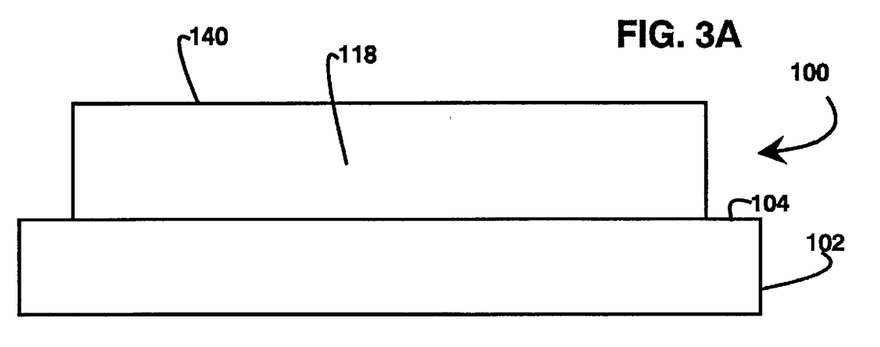
FIGS. 3(a), 3(b) and 3(c) show a side cross-sectional view of the first embodiment structure upon which device components are mounted during successive steps of fabrication.
Figure 3B:
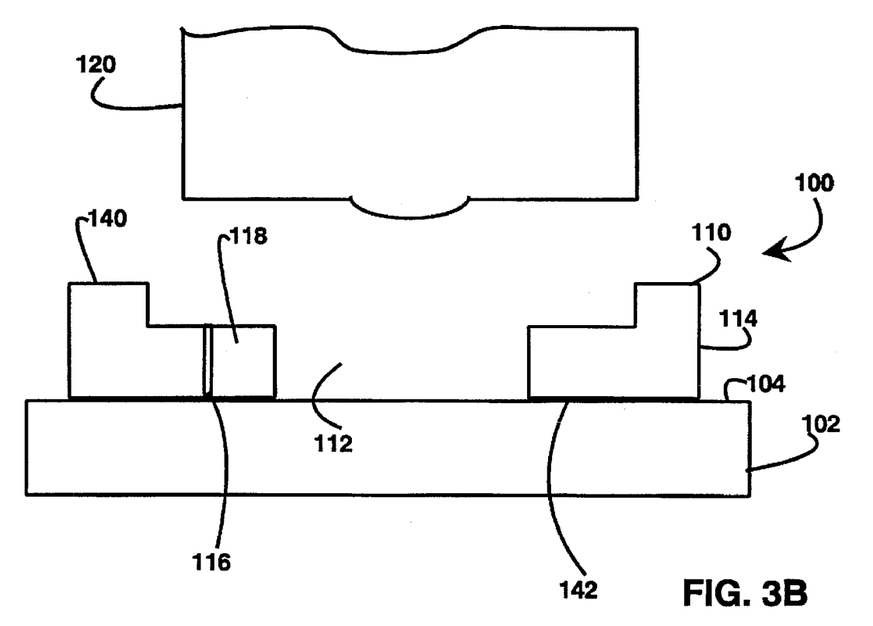
Figure 3C:
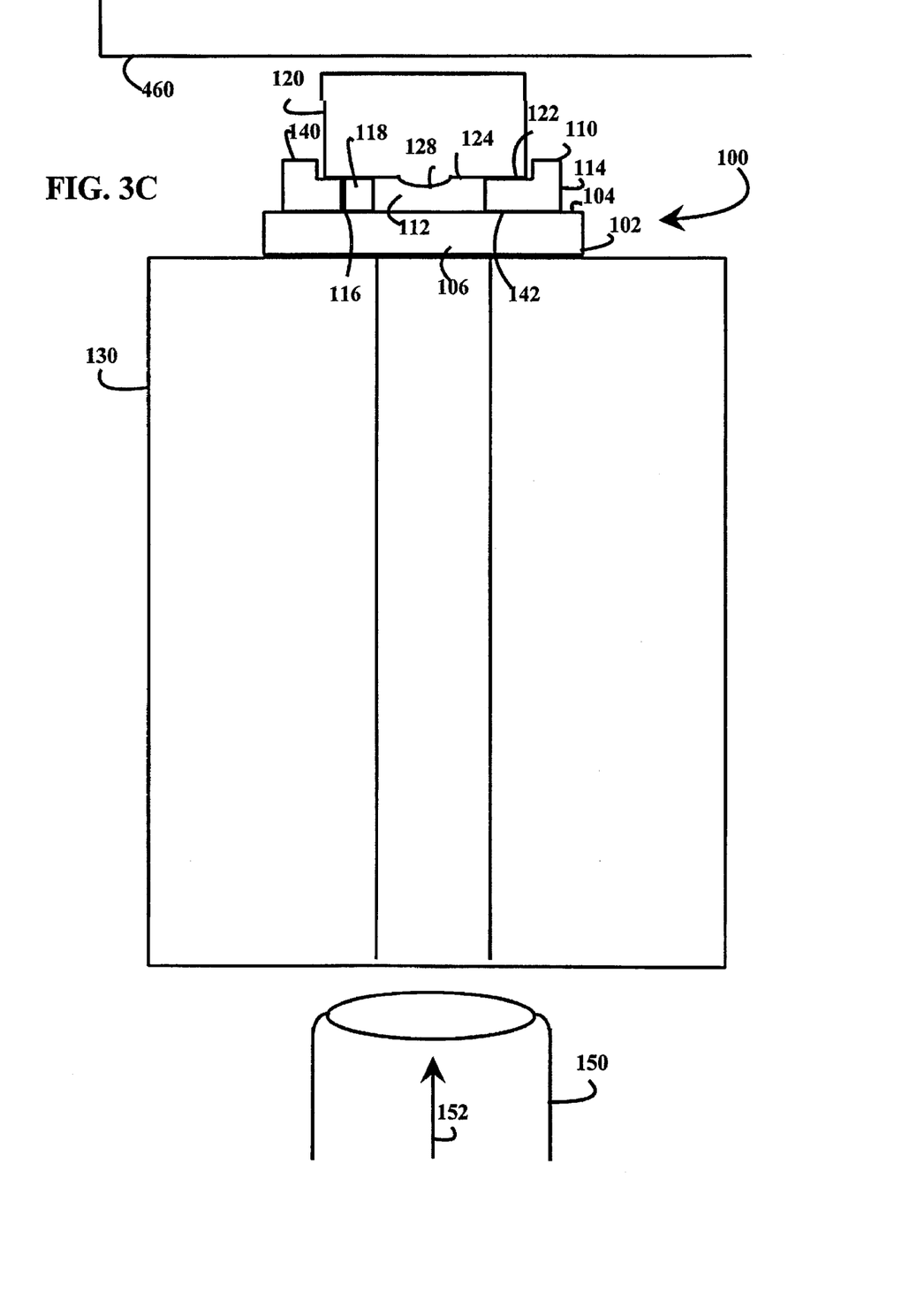

FIGS. 3(a) through 3(c) show a method of arranging the alignment of a component 120, for example a thin-film magnetic head. The type of component 120 is understood to be considered in general as any suitable electrical or mechanical device component or the like.

Referring to FIG. 3(a), the first step in the fabrication process is the step of forming a photoresist layer 118 on a surface of a transparent substrate 102. The photoresist layers 118 are deposited on the first planar surface 104 of the transparent substrate wafer 102 to form a photoresist surface 140. Photoresist is a polymer which is easily dissolved and removed and is thus a versatile material for forming one or more well structures of various sizes and shapes. The photoresist layers 118 are first spin coated onto the substrate wafer 102, then selectively exposed to a form of radiation, such as ultraviolet light, electrons or x-rays. An exposure tool and mask, or a data tape if electron beam lithography is used, expose the photoresist layers 118. In this manner, the photoresist layers 118 are hardened or cured to furnish a durable adhering structure on the substrate wafer 102. The photoresist layers 118 are applied in multiple coats or layers with the individual layers forming a laminated structure, to construct various photoresist thicknesses upon the transparent substrate wafer 102. In this manner, the heights of various well structures, support structures or other arrangements are formed. The thickness of the photoresist layer is selected and varied at selected positions on the substrate surface to generally support the component 120 while isolating particular portions of a component surface (not shown) from the photoresist surface 140.

The photoresist layers 118 are then patterned in a conventional development step to form the photoresist structures. In addition to the structural shapes of the photoresist layers 118, alignment patterns 116 are formed on the substrate 102. Referring to FIG. 3(b), the photoresist layers 118 are patterned to form the well structure 110 at a selected known and calibrated position 142 upon the transparent substrate wafer 102. The photoresist well structure 110 is formed to furnish a structure having a shape and size that are suitable for receiving the component 120, such as a thin-film magnetic head. The position 142 of the photoresist well structure 110 is calibrated by mutually correlating the photomask (not shown) which is used to fabricate the photoresist layer 118 to a photomask or photomasks which are used to construct the component surface. In this manner, the photoresist well structure 110 is deposited, patterned and cured at a known and preselected X-Y coordinate location and orientation upon the transparent substrate wafer 102 that corresponds to coordinate location and orientation of a corresponding component 120. Photomask technology permits highly accurate reference alignment patterns to be patterned into the photoresist layer 118.

The shape and size of the photoresist well structure 110 is devised to form a suitable structure for holding the component 120 under force of gravity, while the component 120 is aligned. Patterning of the photoresist layers 118 is also used to furnish an alignment pattern 116 which is used to align the component 120 as it is held by the well structure 110.

After the photoresist well structure 110 is patterned, the photoresist layers 118 are cured by a dehydration baking or electron beam lithography process. Curing drives off solvents and polymerizes plastics to cause the photoresist to become more insoluble and thus more difficult to remove. The photoresist is cured using a baking process by subjecting the transparent substrate wafer 102 and overlying photoresist to high temperatures, such as temperatures generated within an oven, for a relatively long period of time.

In FIG. 3(c), the photoresist well structure 110 includes the interior open region or aperture 112 through which the medial portion 124 of the substantially planar surface 122 is viewed from the second planar surface 106 of the transparent substrate wafer 102. The substantially planar surface 122 of the component 120 and the second planar surface 106 of the photoresist well structure 110 are simultaneously viewed using a video viewing system or microscope 150. The medial portion 124 of the substantially planar surface 122 of the component 120 includes unique alignment markings 128 which identify the position of the component 120. The video viewing system or microscope 150 includes a right angle objective lens (not shown) having a viewing direction away from the translation stages and thus has the capability of viewing targets that are separated perpendicular to the viewing direction. Video viewing system or microscope 150 passes an alignment light beam 152 through the optically transparent substrate wafer 102 and substantially perfectly reaches the surface of the alignment marking 128 without regard to thickness and surface unevenness of these films, and reflected and refracted light from the alignment mark is easily detected to thereby effect the alignment precisely. Thickness uniformity of photoresist used to form the photoresist well structure 110 is sufficiently accurate, the photoresist is sufficiently flat, for usage as a reference surface for holding the device component 120 level as the component 120 is aligned by rotation about an axis perpendicular to the surface of the photoresist well structure 110.

The component 120 is placed in the well 110, the component 120 marking is visually aligned with the marking on the photoresist layer, and the component 120 is rotated until the component is aligned. Accuracy of alignment is achieved by first placing the component 120 in the well 110 to achieve coarse alignment, visual alignment of the marking on the component 120 to the marking on the photoresist layer. Fine alignment is then performed by moving the coarsely aligned component 120 in x and y linear dimensions in the plane of the surface of the well 110 and in an angular dimension about the axis perpendicular to the well surface to align fiducial targets (not shown) on the component 120 with targets (not shown) in a video viewing system.

A device component 120 is aligned and mounted in accordance with this embodiment by placing the component 120 in the photoresist well structure 110, where the component 120 is held in position by force of gravity. A technician views the alignment marking 128 on the medial potion 124 of the substantially planar surface 122 of the component 120 and the alignment pattern 116 on the photoresist well structure 110, simultaneously. The technician then rotates the component 120, or the structure (not shown) to which the component 120 is attached, until the alignment markings 128 on the component are aligned with the photoresist well structure alignment pattern 116. In this manner, the component 120 is coarsely aligned with the photoresist well structure 110. To finely align the component 120, the technician rotates both the photoresist well structure 110 and the component 120 so that a fiducial marker, such as the alignment marking on the component 120 or the photoresist well structure 110 or another fiducial marker on the component 120, is finely aligned with a fiducial marker within the viewing system. The fiducial marker in the viewing system is, for example, a crosshair marker within the video viewing system or microscope 150. When the component 120 is aligned, the component is bonded to a support member 460, which is any suitable structure which is external to the photoresist well structure 110. For example, the support member 460 may be an integrated circuit chip, a miniature circuit board, a substrate such as a ceramic, alumina or other nonconductive material. Each component is affixed to the support member 460 by a suitable bonding method. For example, conventional thermocompression bonding techniques may be used to affix a component to a support member.

Figure 4:
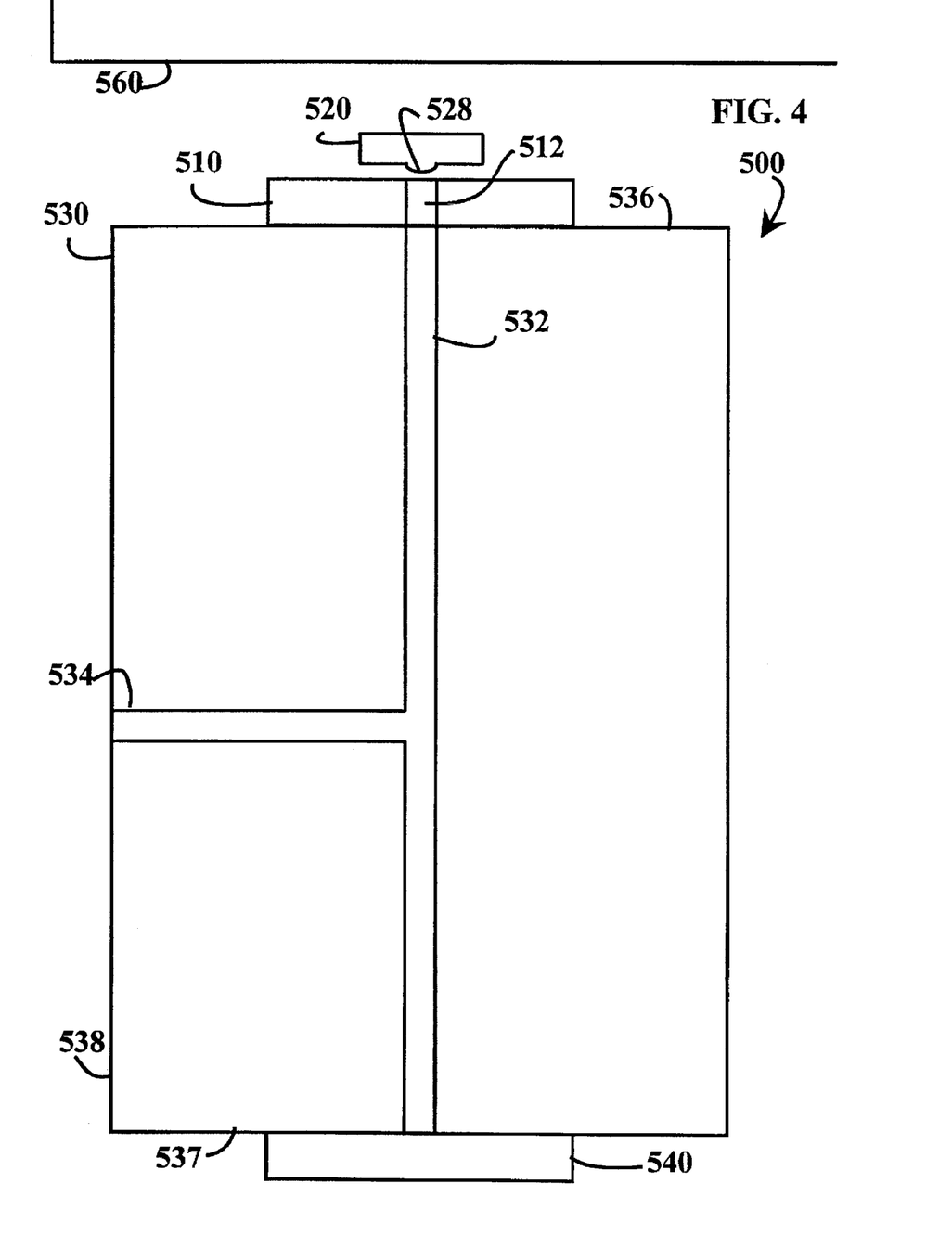
FIG. 4 illustrates a side cross-sectional view of a third embodiment of a structure upon which device components are mounted.
Figure 5:
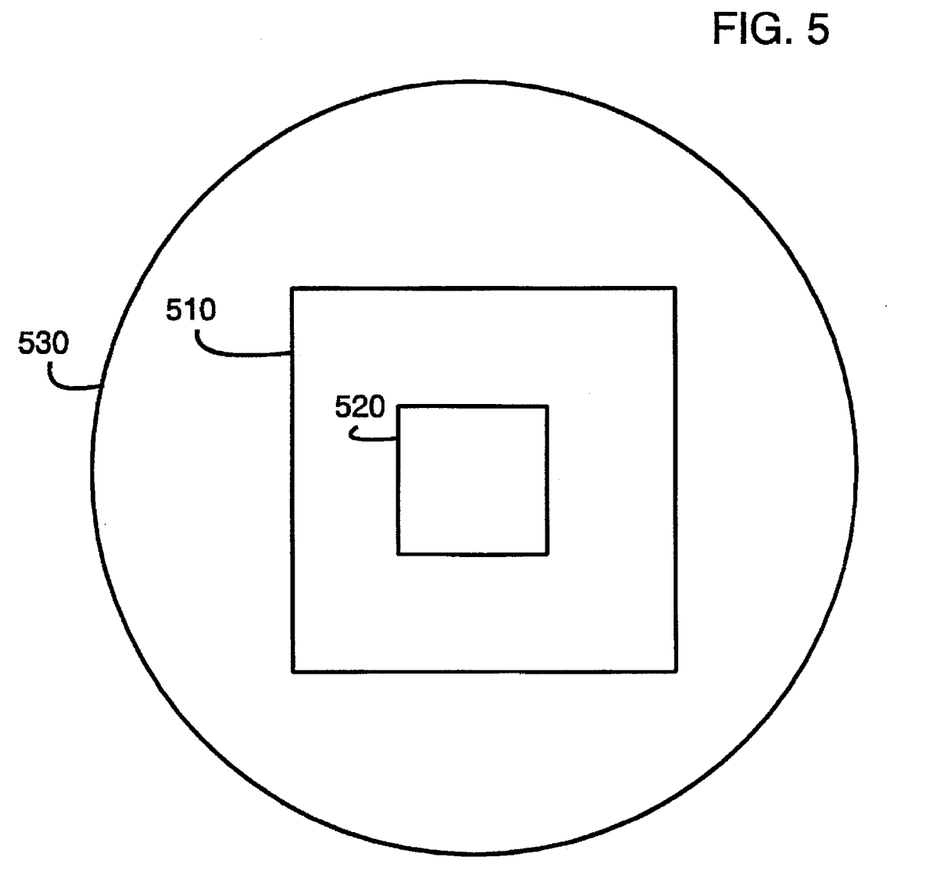
FIG. 5 illustrates a top plan view of the third embodiment structure shown in FIG. 4.

FIG. 4 illustrates a side cross-sectional view of a second embodiment of an alignment structure 500, which uses a vacuum force rather than gravitational force for holding a device component 520 against a structure, such as an integrated circuit structure, upon which device component 520 is mounted. The structure 500 includes a support platform 530, a first transparent substrate wafer 510 and a second transparent substrate wafer 540. The support platform 530, first transparent substrate wafer 510 and device component 520 are also shown in FIG. 5 which depicts a top plan view of the structure 500.

The support platform 530 is a suitable structure such as a metal plate with a level first surface 536 and an opposing level second surface 537. In some embodiments the support platform 530 is a cylindrical metal plate. A viewing aperture 532, which extends from the first surface 536 to the second surface 537, is formed in the support platform 530 to provide for viewing of a device 520 disposed in the vicinity of the first surface 536 using a microscope (not shown) positioned distal to the second surface 537. The line of sight of the microscope is directed toward the support platform 530 second surface 537 through the viewing aperture 532. A vacuum aperture 534 is formed in the support platform 530 and extends from a side 538 to the interior of support platform 530 where the vacuum aperture 534 and the viewing aperture 532 intersect. The viewing aperture 532 and the vacuum aperture 534 are formed in the support platform 530 by a suitable process such as drilling.

The first transparent substrate wafer 510 is positioned adjacent to the first surface 536 of the support platform 530. A viewing aperture 512 is formed in the first transparent substrate wafer 510 extending through the thickness of the wafer 510. The first transparent substrate wafer 510 is positioned so that the viewing aperture 512 is in line with the viewing aperture 532 of the support platform 530. The second transparent substrate wafer 540 is positioned adjacent to the second surface 537 of the support platform 530, covering the viewing aperture 532. The second transparent substrate wafer 540 is similar to the first transparent substrate wafer 510 except that an aperture is not formed in the second transparent substrate wafer 540. Instead, the second transparent substrate wafer 540 forms an airtight bond covering the viewing aperture 532. The second transparent substrate wafer 540 is affixed to the support platform 530 using a suitable adhesive or other coupling so that the wafer 540 is firmly held by the support platform 530.

In some embodiments, an alignment pattern (not shown) is formed on a region of the first transparent substrate wafer 510 so that the pattern is visible while viewing through the viewing aperture 512. In alternative embodiments, the alignment pattern is formed on the second transparent substrate wafer 540 in a region adjacent to the viewing aperture 532 of the support platform 530. The alignment pattern is formed on a transparent substrate wafer 510 or 540 using a suitable procedure, such as etching.

The first and second transparent substrate wafers 510 and 540 have a substantially-planar shape and may be constructed from a material such as transparent quartz, glass, epoxy, fiber glass or plastic. Thickness uniformity of the substrate wafers 510 and 540 exceeds that of the photoresist used to form the photoresist well structure 110, shown in FIG. 1 so that flatness of a reference surface for holding the device component 520 level is improved for aligning the component 520 by rotation. In the illustrative embodiment shown in FIG. 4, the transparent substrate wafers 510 and 540 each form a transparent quartz lens for microscopic viewing of the component 520 through the viewing aperture 532 of the support platform 530.

The device component 520 is positioned overlying the first transparent substrate wafer 510 so that an alignment pattern 528 on a surface of the component 520 is adjacent to the viewing aperture 512. A vacuum pump (not shown) is connected to the vacuum aperture 534 using a suitable tubing material (not shown) and activated so that suction is applied through the vacuum aperture 534 and the viewing aperture 532 of the support platform 530 and through the viewing aperture 512 of the first transparent substrate wafer 510. Suction holds the device component 520 against the first transparent substrate wafer 510.

The microscope passes an alignment light beam through the optically transparent substrate wafers 510 and 540 and substantially perfectly reaches the surface of the alignment marking 528. Reflected and refracted light from the alignment marking 528 is easily detected so that the component 520 is easily manipulated and precisely aligned.

A device component 520 is aligned and mounted in accordance with this embodiment by placing the component 520 overlying the first transparent substrate wafer 510 with the alignment marking 528 positioned in the viewing aperture 512. A suction force is applied to the vacuum aperture 534 of the support platform 530 to firmly hold the component 520 against the first transparent substrate wafer 510. A technician views the alignment marking 528 on the component 520 and the alignment pattern on the first transparent substrate wafer 510, simultaneously. The technician then rotates the component 520, or the structure (not shown) to which the component 520 is attached, until the alignment markings 528 on the component are aligned with the alignment pattern on the first substrate wafer 510. Alignment includes a coarse and fine alignment steps to realize a high accuracy of alignment. During coarse alignment, the component 520 is placed on the first transparent substrate wafer 510 and the position of the component 520 is adjusted so that alignment markings 528 on the component are aligned with the alignment pattern on the first substrate wafer 510. Fine alignment is then performed by moving the coarsely aligned component 520 in x and y linear dimensions in the plane of the surface of the first transparent substrate wafer 510 and in an angular dimension about the axis perpendicular to the wafer 510 surface to align fiducial targets (not shown) on the component 520 with targets (not shown) in a video viewing system (not shown). When the component 520 is aligned, the component is bonded to a support member 560, which is a suitable structure which is external to the alignment structure 500. For example, the support member 460 may be an integrated circuit chip, a miniature circuit board, a substrate such as a ceramic, alumina or other nonconductive material. Components are affixed to the support member 560 using a suitable bonding method.

Figure 6:
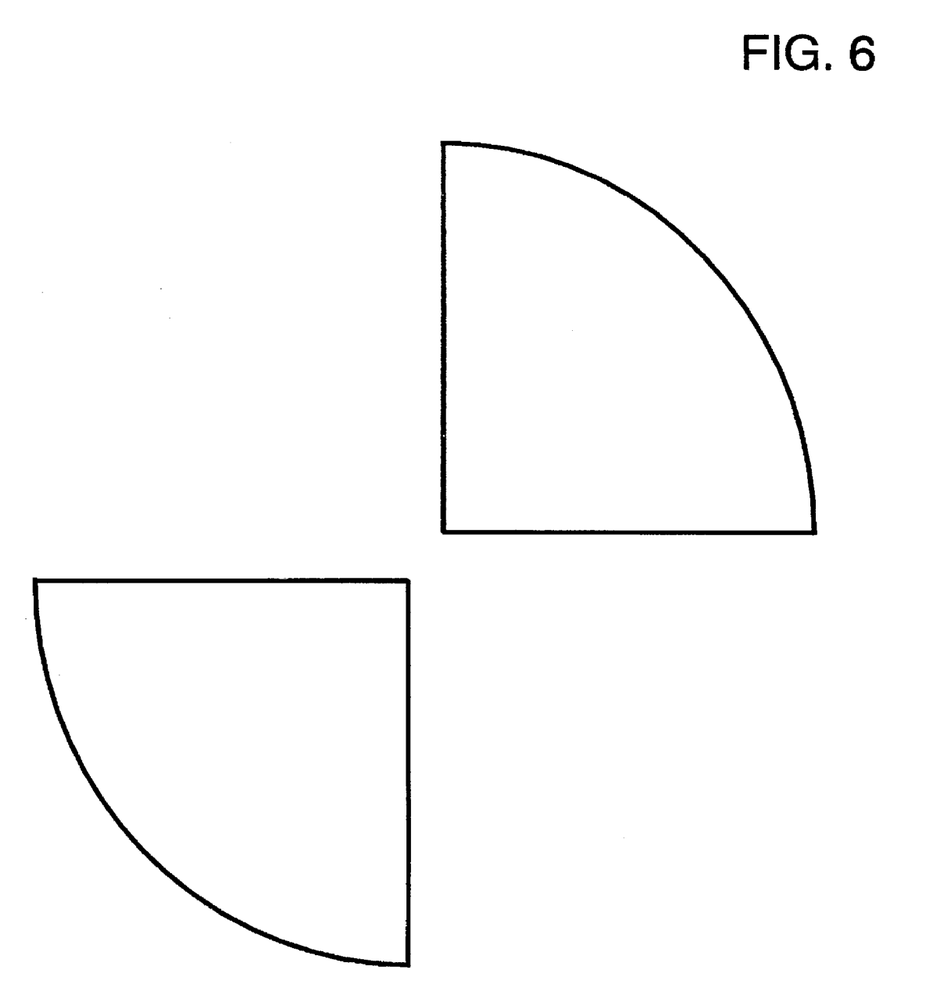
FIG. 6 depicts an example of an alignment pattern which is utilized to align structures shown in the first, second and third embodiments.

The alignment markings are formed in various suitable shapes or forms. One example of an alignment pattern is shown in FIG. 6. This alignment pattern is representative of the types of patterns which are etched into a silicon wafer such as wafer 510 and 540 for aligning a component.

The description of certain embodiments of this invention is intended to be illustrative and not limiting. Numerous other embodiments will be apparent to those skilled in the art, all of which are included within the broad scope of this invention. For example, although the method of the invention is described herein in terms of employing a photoresist material which is deposited on the substrate, other coating materials may alternatively be used including various plastics and the like which are removed or patterned by the use of etchants.

What is claimed is:

1. A method of affixing a component to a structure in an aligned position comprising the steps of:

placing the component having an alignment marking upon a support structure having a viewing aperture and having an alignment pattern so that the alignment marking and the alignment pattern are visible through the viewing aperture;

simultaneously viewing the alignment marking and the alignment pattern through the viewing aperture;

aligning the component upon the support structure so that the alignment marking of the component is aligned with respect to the alignment pattern of the support structure as viewed simultaneously through the viewing aperture; and bonding the aligned component to a structural member.

2. A method as in claim 1 wherein the support structure includes a well structure coupled to a transparent substrate wafer and the method of includes the step of forming the well structure further comprising the steps of:

depositing a layer of photoresist on a first surface of a transparent substrate wafer;

forming the photoresist layer into a well structure having an interior aperture and exterior walls formed to support the component; and marking an alignment pattern into the well structure so that the alignment pattern is visible through a second surface of the transparent substrate wafer, the second surface being opposite to the first surface.

3. A method as in claim 2, wherein the step of forming the photoresist layer into a well structure further comprises the step of curing the photoresist by a baking process.

4. A method as in claim 1, wherein the step of forming the photoresist layer into a well structure further comprises the step of curing the photoresist by an electron beam lithography process.

5. A method as in claim 1 wherein:

the support structure includes:

a support platform having a support platform viewing aperture and a vacuum aperture;

a first transparent substrate wafer adjacent to a first planar surface of the support platform and having a substrate wafer viewing aperture arranged in line with the support platform viewing aperture;

and a second transparent substrate wafer adjacent to a second planar surface of the support platform opposite to the first planar surface, the second transparent substrate wafer sealing the support platform viewing aperture, the method further comprising the steps of:

applying a suction force to the vacuum aperture, holding the component to the first transparent substrate wafer.

6. A method as in claim 1, wherein the component is a magnetic head.

7. A method as in claim 1 wherein the viewing step includes the step of simultaneously viewing the alignment marking and the alignment pattern through the viewing aperture using a video viewing system or a microscope.

8. A method as in claim 1 wherein the aligning step is a coarse aligning step, the method further including the step of:

fine aligning the component upon the support structure using a video viewing system so that a fiducial target of the component is aligned with respect to alignment crosshairs of the video viewing system.

9. A method of affixing a component to a structure in an aligned position comprising the steps of:

depositing a layer of photoresist on a first surface of a transparent substrate wafer;

forming the photoresist layer into a well structure having an interior aperture and exterior walls formed to support the component;

marking an alignment pattern into the well structure so that the alignment pattern is visible through a second surface of the transparent substrate wafer, the second surface being opposite to the first surface;

placing the component having an alignment marking on a surface upon the well structure so that the alignment marking is visible through the interior aperture of the well structure and through the second surface of the transparent substrate wafer;

aligning the component within the well structure so that the alignment marking of the component is aligned with respect to the alignment pattern of the well structure as viewed simultaneously through the interior aperture of the well structure and through the second surface of the transparent substrate wafer; and bonding the aligned component to a structural member.

10. A method as in claim 9, wherein the component is a magnetic head.

11. A method as in claim 9, wherein the step of forming the photoresist layer into a well structure further comprises the step of curing the photoresist by a baking process.

12. A method as in claim 9, wherein the step of forming the photoresist layer into a well structure further comprises the step of curing the photoresist by an electron beam lithography process.

13. A method as in claim 9 wherein the aligning step is a coarse aligning step, the method further including the step of:

fine aligning the component upon the support structure using a video viewing system so that a fiducial target of the component is aligned with respect to alignment crosshairs of the video viewing system.

14. A method of affixing a component to a structure in an aligned position comprising the steps of:

marking an alignment indicator on a bottom surface of the component;

patterning a photoresist layer upon a top surface of a transparent substrate wafer to form a photoresist well for receiving the component, the pattern including markings for aligning the component;

positioning the component in the photoresist well;

simultaneously viewing the alignment between the alignment markings on the bottom surface of the component and the markings on the photoresist layer from a vantage point viewing from a bottom surface to the top surface of the transparent substrate wafer;

in accordance with the viewed alignment, rotationally aligning the alignment markings on the bottom surface of the component with the alignment markings of the photoresist layer; and affixing the aligned component to an external support member.

15. A method as in claim 14 further comprising the step of curing the patterned photoresist layer.

16. A method as in claim 14 wherein the rotationally aligning step is a coarse rotationally aligning step, the method further including the step of:

fine aligning the component upon the photoresist well using a video viewing system so that a fiducial target of the component is aligned with respect to alignment crosshairs of the video viewing system.

* * * * *